BEST AVAILABLE COPY

NO DRAWING.

No. 8205 X PATENTED May 16 1834

Lemuel Lyon 2nd

Improvement in Manuf of Napped hats

DESCRIPTION:

The improvement consists in applying to use what has heretofore been considered worthless viz: "Lod-Striker" or "Skimmings of the kettle" which consists of cotton hair and fur so mixed together as not to be separable by any known process. The whole of it can be pressed dried and worked with wool, for the purpose of making napped hats, so as to constitute a component part of hat bodies.

2/192

CLAIM:

The claim is for the converting the "Lod-gum" striker or "skimming" of the kettle, to use.

Letters Patent.

The Schedule referred to in these Letters Patent, and making part of the same, containing a description in the words of the said Samuel Lyon 2nd himself, of his improvement in the manufacture of Napped hats.

To all to whom these presents shall come,

Be it known that I Samuel Lyon 2nd of Needham in the County of Norfolk & Commonwealth of Massachusetts have discovered a new and useful improvement in the Manufacture of Napped hats, & that the following is a full and exact description or account of said improvement.

Said improvement consists in applying to use, ~~and~~ as an ingredient in making napped hats, a material which hatters have heretofore thrown away as of no value. this material is known among workmen by the name of "Sedgum Sticker" or "Skimmings of the kettle" & is produced as follows. When in bowing naps, or layers for hats, a small portion of Cotton or Cotton-waste has been mixed with the fur, in a subsequent part of the process, which is called napping, the whole of the cotton or waste will be disengaged or detached from the body of the hat, together with the principal part of the hair in the fur and a small portion of the fur itself, and the whole will float upon the surface of the water in the napping kettle. This material consisting of cotton hair & fur, so mingled together as not to be separable by any known process, has heretofore been thrown away as worthless. The whole of it however, for the purpose of making napped hats, can be preserved, dried and worked in with wool, so as to constitute a compound 3. APPAREL,
192
Examiner
BEST AVAILABLE COPY 8205 X L. Lyon May 16 – 1834 component part of hat bodies.— What I claim as my improvement is, the converting to use, as above described this "Lac-gum strikes" or "skimmings of the kettle." —

A sample of this material together with a hat body into which a portion of it has been wrought, accompanies this application. —

In testimony that the above is a true specification of my said improvement as above described I have hereunto set my hand this fifth day of April in the year of our Lord eighteen hundred & thirty four. —

Witnesses
Edwd. G. Loring
Horace Mann

Samuel Lyon 2nd